US010642817B2

(12) United States Patent
Liang et al.

(10) Patent No.: US 10,642,817 B2
(45) Date of Patent: May 5, 2020

(54) INDEX TABLE UPDATE METHOD, AND DEVICE

(71) Applicant: Huawei Technologies Co., Ltd., Shenzhen (CN)

(72) Inventors: Xiaohao Liang, Hangzhou (CN); Xiaoyong Lin, Hangzhou (CN); Tieying Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 15/715,585

(22) Filed: Sep. 26, 2017

(65) Prior Publication Data

US 2018/0018361 A1    Jan. 18, 2018

Related U.S. Application Data

(63) Continuation of application No. PCT/CN2015/080694, filed on Jun. 3, 2015.

(51) Int. Cl.
*G06F 16/23* (2019.01)
*G06F 16/22* (2019.01)
(Continued)

(52) U.S. Cl.
CPC ............. *G06F 16/23* (2019.01); *G06F 16/00* (2019.01); *G06F 16/2272* (2019.01); *G06F 16/2282* (2019.01); *G06F 16/328* (2019.01)

(58) Field of Classification Search
CPC ............. G06F 3/0604; G06F 16/2255; G06F 16/2455; G06F 16/2329; G06F 16/28; G06F 16/23; H04L 51/063
See application file for complete search history.

(56) References Cited

U.S. PATENT DOCUMENTS 6,122,626 A     9/2000  Brandsma
10,095,765 B1 * 10/2018  Ma .................. G06F 16/28
(Continued)

FOREIGN PATENT DOCUMENTS

CN      101315628 A    12/2008
CN      102402617 A     4/2012
(Continued)

OTHER PUBLICATIONS

Machine Translation and Abstract of Chinese Publication No. CN102402617, Apr. 4, 2012, 15 pages.
(Continued)

*Primary Examiner* — Etienne P Leroux
(74) *Attorney, Agent, or Firm* — Conley Rose, P.C.

(57) ABSTRACT

An index table update method, and a device are presented. The method includes adjusting an index density of a second index table in a memory when determining that storage space occupied by the second index table reaches an upper limit or a lower limit of a preset range, where the index density of the second index table is a ratio of a quantity of index records included in the second index table to a quantity of index records included in a first index table in an external storage; and selecting an index record from the first index table according to the adjusted index density, and updating the second index table using the selected index record. In this way, the second index table is dynamically adjusted according to a storage space occupation status of the memory, and system performance and retrieval efficiency are further ensured.

20 Claims, 4 Drawing Sheets

(51) Int. Cl.
*G06F 16/31* (2019.01)
*G06F 16/00* (2019.01)

(56) References Cited

U.S. PATENT DOCUMENTS

| | | | |
|---|---|---|---|
| 2003/0135518 A1* | 7/2003 | Anglin | G06F 16/2329 |
| 2008/0243781 A1* | 10/2008 | Kuhr | G06F 16/2455 |
| 2009/0198947 A1 | 8/2009 | Khmelnitsky et al. | |
| 2012/0102298 A1 | 4/2012 | Sengupta et al. | |
| 2012/0124056 A1 | 5/2012 | Egan et al. | |
| 2012/0179698 A1 | 7/2012 | Muras | |
| 2013/0262601 A1* | 10/2013 | Bao | H04L 51/063 |
| | | | 709/206 |
| 2014/0317093 A1* | 10/2014 | Sun | G06F 16/2255 |
| | | | 707/722 |
| 2016/0098199 A1* | 4/2016 | Golden | G06F 3/0604 |
| | | | 711/102 |

FOREIGN PATENT DOCUMENTS

| | | |
|---|---|---|
| CN | 103314377 A | 9/2013 |
| CN | 104077380 A | 10/2014 |
| CN | 104092670 A | 10/2014 |
| CN | 104133781 A | 11/2014 |
| CN | 104133867 A | 11/2014 |

OTHER PUBLICATIONS

Machine Translation and Abstract of Chinese Publication No. CN104092670, Oct. 8, 2014, 18 pages.
Machine Translation and Abstract of Chinese Publication No. CN104133867, Nov. 5, 2014, 19 pages.
Foreign Communication From a Counterpart Application, PCT Application No. PCT/CN2015/080694, English Translation of International Search Report dated Mar. 7, 2016, 2 pages.
Machine Translation and Abstract of Chinese Publication No. CN101315628, Dec. 3, 2008, 32 pages.
Machine Translation and Abstract of Chinese Publication No. CN104077380, Oct. 1, 2014, 18 pages.
Machine Translation and Abstract of Chinese Publication No. CN104133781, Nov. 5, 2014, 17 pages.
Foreign Communication From a Counterpart Application, Chinese Application No. 201580001281.5, Chinese Office Action dated Apr. 11, 2019, 3 pages.
Foreign Communication From a Counterpart Application, Chinese Application No. 201580001281.5, Chinese Search Report dated Apr. 2, 2019, 2 pages.

* cited by examiner

INDEX TABLE UPDATE METHOD, AND DEVICE

CROSS-REFERENCE TO RELATED APPLICATION

This application is a continuation of International Application No. PCT/CN2015/080694, filed on Jun. 3, 2015, which is hereby incorporated by reference in its entirety.

TECHNICAL FIELD

Embodiments of the present application relate to the storage field, and in particular, to an index table update method, and a device.

BACKGROUND

When a processor of a data processing device works, a memory database is usually created in a memory, so as to accelerate data search and to avoid that data is traversed and searched from a hard disk by accessing the hard disk over a disk input/output (I/O) port. An index table in the memory database stores an index record, and data in the hard disk may be indexed according to the index record. In this way, during data search using a keyword, an index record of a corresponding record in the index table in the memory is first searched for according to a value of the keyword. If a pointer in the index record directly points to data mapped to the value of the keyword, data is read according to the found index record. If the pointer in the index record does not directly point to the data mapped to the value of the keyword, a search range of the data may be narrowed according to the index record, and the index record of the data is further searched for with reference to a mapping table in the hard disk. An index record in the mapping table in the hard disk includes a pointer pointing to the data, and the data mapped to the value of the keyword is read according to the pointer. After the index record corresponding to the keyword is found, it is determined, by searching, whether data corresponding to the index record is stored in the memory. If the memory stores the data, the processor directly reads the data from the memory. If the memory does not store the data, the processor reads the data from the hard disk according to the index record.

A data amount in a big data application scenario is relatively large. However, storage space for storing an index record in the memory is limited, the storage space is generally far less than a storage capacity of a hard disk, and not all index records in the hard disk can be loaded to the memory to improve searching performance. Therefore, a proper policy needs to be used to determine an index record to be loaded to the memory to improve retrieval efficiency, thereby further improving system performance.

SUMMARY

In view of this, embodiments of the present application provide an index table update method and a device. When storage space in a memory for storing an index table is limited, an index density is adjusted in time to ensure retrieval efficiency.

According to a first aspect, an embodiment of the present application provides an index table update method, where the index table update method includes adjusting an index density of a second index table in a memory when determining that storage space occupied by the second index table reaches an upper limit or a lower limit of a preset range, where the index density of the second index table is a ratio of a quantity of index records included in the second index table to a quantity of index records included in a first index table in an external storage, and an index record in the second index table is synchronously updated according to the index density when an index record in the first index table is updated; and selecting an index record from the first index table according to the adjusted index density, and updating the second index table using the selected index record.

With reference to the first aspect, in a first possible implementation, the adjusting an index density of a second index table in a memory when determining that storage space occupied by the second index table reaches an upper limit or a lower limit of a preset range includes reducing the index density of the second index table in the memory if determining that the storage space occupied by the second index table reaches the upper limit of the preset range.

With reference to the first aspect or the first possible implementation of the first aspect, in a second possible implementation, the adjusting an index density of a second index table in a memory when determining that storage space occupied by the second index table reaches an upper limit or a lower limit of a preset range includes increasing the index density of the second index table in the memory if determining that the storage space occupied by the second index table is less than the lower limit of the preset range, and that the index density is less than 1.

With reference to the first aspect, the first possible implementation of the first aspect, or the second possible implementation of the first aspect, in a third possible implementation, the method further includes synchronously deleting an index record from the second index table according to the first index table and the index density when deleting an index record from the first index table; and synchronously adding an index record to the second index table according to the first index table and the index density when adding an index record to the first index table.

With reference to the third possible implementation of the first aspect, in a fourth possible implementation, the method further includes deleting data that is in the memory and that is corresponding to the synchronously deleted index record when synchronously deleting the index record in the second index table according to the first index table and the index density.

According to a second aspect, an embodiment of the present application provides a data processor, where the data processor includes an index density adjustment unit configured to adjust an index density of a second index table in a memory when it is determined that storage space occupied by the second index table reaches an upper limit or a lower limit of a preset range, where the index density of the second index table is a ratio of a quantity of index records included in the second index table to a quantity of index records included in a first index table in an external storage, and an index record in the second index table is synchronously updated according to the index density when an index record in the first index table is updated; and a second index table update unit configured to select an index record from the first index table according to the adjusted index density, and update the second index table using the selected index record.

With reference to the second aspect, in a first possible implementation, that an index density adjustment unit is configured to adjust an index density of a second index table in a memory when it is determined that storage space occupied by the second index table reaches an upper limit or a lower limit of a preset range includes the index density adjustment unit is configured to reduce the index density of the second index table in the memory if it is determined that the storage space occupied by the second index table reaches the upper limit of the preset range.

With reference to the second aspect or the first possible implementation of the second aspect, in a second possible implementation, that an index density adjustment unit is configured to adjust an index density of a second index table in a memory when it is determined that storage space occupied by the second index table reaches an upper limit or a lower limit of a preset range includes the index density adjustment unit is configured to increase the index density of the second index table in the memory if it is determined that the storage space occupied by the second index table is less than the lower limit of the preset range, and that the index density is less than 1.

With reference to the second aspect, the first possible implementation of the second aspect, or the second possible implementation of the second aspect, in a third possible implementation, the data processor further includes a synchronous update unit configured to synchronously delete an index record from the second index table according to the first index table and the index density when deleting an index record from the first index table, where the synchronous update unit is configured to synchronously add an index record to the second index table according to the first index table and the index density when adding an index record to the first index table.

With reference to the third possible implementation of the second aspect, in a fourth possible implementation, the synchronous update unit is further configured to delete data that is in the memory and that is corresponding to the synchronously deleted index record when synchronously deleting the index record from the second index table according to the first index table and the index density.

According to a third aspect, an embodiment of the present application provides a data processing device, where the data processing device includes a processor and a storage, and the processor and the storage are connected using a bus; and the storage is configured to store a computer-executable instruction, and when the data processing device runs, the processor reads the computer-executable instruction in the storage, so that the data processing device executes the index table update method according to the first aspect or any possible implementation of the first aspect.

According to the foregoing solutions, in a process of synchronously updating a second index table in a memory and a first index table in an external storage, if storage space in the memory occupied by the second index table reaches an upper limit or a lower limit of a preset range, an index density is adjusted. An index record is reselected from the first index table according to the adjusted index density, and the second index table is updated using the reselected index record. In this way, the second index table is dynamically adjusted according to a storage space occupation status of the memory, and system performance and retrieval efficiency are further ensured.

DESCRIPTION OF EMBODIMENTS

The following clearly describes the technical solutions in the embodiments of the present application with reference to the accompanying drawings in the embodiments of the present application.

Figure 1:
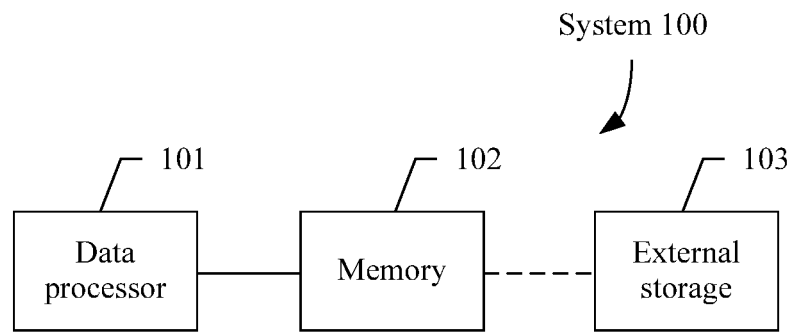
FIG. 1 is a schematic diagram of a logical system structure of an application scenario of an index table update method.

A system 100 shown in FIG. 1 includes a data processor 101, a memory 102, and an external storage 103.

The external storage 103 in FIG. 1 is a storage medium such as a floppy disk, a USB flash drive, a hard disk, and a disk array. A specific storage medium constituting the external storage 103 is not limited. However, the external storage 103 needs to have a characteristic of keeping data during a power failure, so as to store the data. Generally, a driver of a data processing device, a start-up program of the data processing device, and large-size data are stored in the external storage 103. If the processor 101 and the external storage 103 are not decoupled, the data processor 101 and the external storage 103 are connected using a bus. The data processor 101 may access the external storage 103 using a disk I/O port, and perform operations such as data read and data write on the external storage 103. If the processor 101 and the external storage 103 are decoupled, the processor 101 first establishes a communication connection to a controller included in the external storage 103, and then exchanges data with the external storage 103 using a message. The message is used to carry the data.

The memory 102 in FIG. 1 is one of important parts in the data processing device, and is configured to temporarily store operational data (including a computer instruction) during running of the data processor 101, and data exchanged with the external storage 103 such as a hard disk. Therefore, the memory 102 is a bridge for communication between the external storage 103 and the data processor 101. Therefore, a program in the data processing device runs based on the memory, and performance of the memory (for example, a size of the memory, especially a size of storage space that is in the memory and that is for storing an index record) greatly affects a computer. For example, during running of the data processing device, the data processor 101 first transfers data that is in the external storage 103 and on which operation needs to be performed to the memory 102 to perform the operation. After the operation is completed, the data processor 101 writes an operation result into the external storage 103. Operating performance of the data processing device depends on operating performance of the memory 102 to some extent.

The data processor 101 in FIG. 1 may be a central processing unit (CPU). The CPU functions as a control core of the data processing device, interprets and executes a computer-executable instruction, and processes software data and/or hardware data in a computer. The data processor 101 may be a coprocessor, such as a Many Integrated Core (MIC) architecture processor, which processes a special task, or even a specific code segment to assist a CPU in a control core. The data processor 101 may access the memory 102 and the external storage 103. A time needed to access the memory 102 is less than a time needed to access the external storage 103.

Optionally, if the data processor 101 and the external storage 103 are decoupled, the data processor 101 belongs to a processor pool, and the external storage 103 belongs to a storage pool. After establishing a communication connection to the controller included in the external storage 103, the data processor 101 exchanges data with the external storage 103 using a message. The data exchange includes an index record exchange, so as to implement a synchronous update of an index table in the memory and an index table in the external storage.

For example, the data processor 101 sends a message of a data request to the external storage 103. The controller in the external storage 103 receives the message, obtains the request from the message by means of parsing, generates a response message carrying data specified in the request, and sends the response message to the data processor 101. The data processor 101 obtains the data from the response message by means of parsing, and writes the data obtained by means of parsing into the memory 102. Subsequently, when the data processor 101 needs to obtain the data again, the data processor 101 can directly read the data from the memory 102, thereby improving read efficiency. Similarly, the data processor 101 may generate a message carrying a processing result obtained by the data processor 101 by processing the data, and the controller in the external storage 103 writes the processing result into storage space of the external storage 103.

An embodiment of the present application provides an example of implementing an index table update method. The following describes in detail the index table update method.

First, an index table is created in an external storage for a data table, and an index record is created in the index table for each piece of data in the data table. In addition, an index table is created in a memory for the data table according to a size of memory space in the memory that can be occupied for creating the index table. Partial or all index records are selected from the index table in the external storage and are added to the index table in the memory.

In this embodiment, an index density is defined as a ratio of a quantity of index records included in the index table in the memory to a quantity of index records included in the index table in the external storage. That is, the index density is equal to a ratio obtained by dividing a first quantity (the first quantity is the quantity of the index records included in the index table in the memory) by a second quantity (the second quantity is the quantity of the index records included in the index table in the external storage).

The index table in the external storage stores an index record of each piece of data. According to whether the index table in the memory includes all index records in the index table in the external storage, the index table created in the memory is classified into a sparse index table and a dense index table.

Figure 2A:
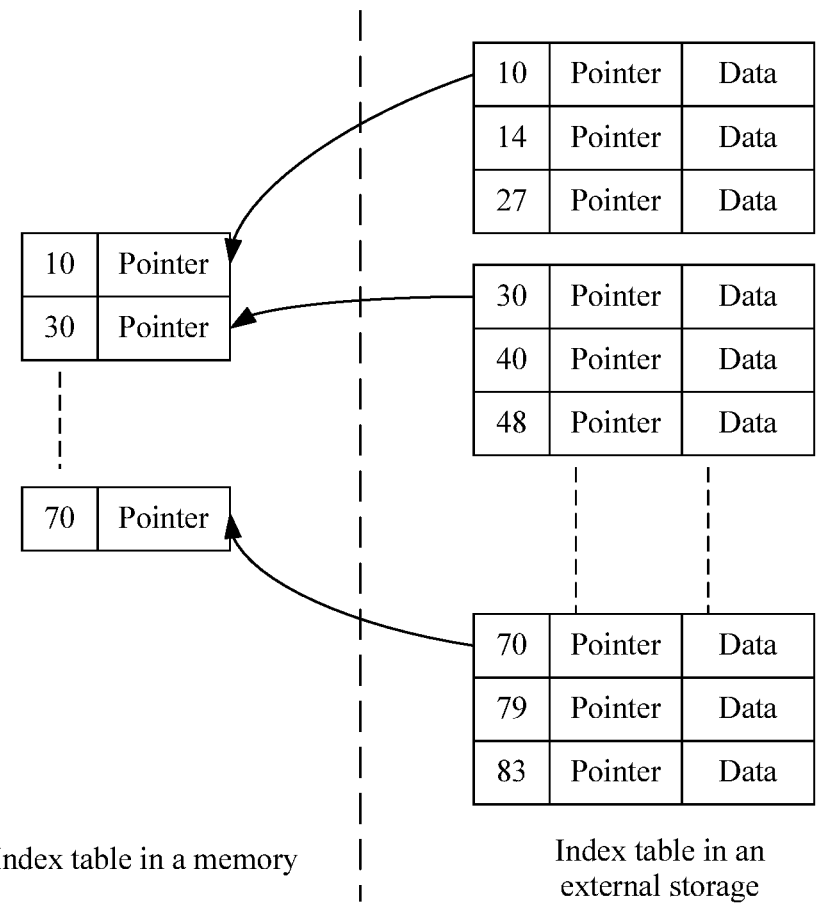
FIG. 2A is a schematic diagram of implementation of creating a sparse index table in a memory according to an index table in an external storage.

A manner of creating a sparse index table is as follows. All data included in a data table in the external storage is divided into multiple groups according to a keyword value, and each group includes multiple pieces of data in the data table; after index records corresponding to all the data included in the data table in the external storage are ranked according to the keyword value, the first index record ranking high is selected from index records that are corresponding to a group of data and that are included in the index table in the external storage, and is added to the index table in the memory; and in the index table in the memory, only one index in index records that are corresponding to a group of data including multiple keyword values and that are in the index table in the external storage is stored in the index table in the memory. Therefore, an index density of the sparse index table is less than 1. FIG. 2A is used as an example. In FIG. 2A, keywords in an index table in an external storage are ranked. After keyword values of the keywords of different data in a data table are ranked, the ranked keyword values are {10, 14, 27, 30, 40, 48, . . . , 70, 79, 83}. One index record is selected from the index table of the external storage at an interval of two keyword values and is added to an index table in a memory. Therefore, keyword values in index records included in the index table in the memory are sequentially {10, 30, . . . , 70}.

Figure 2B:
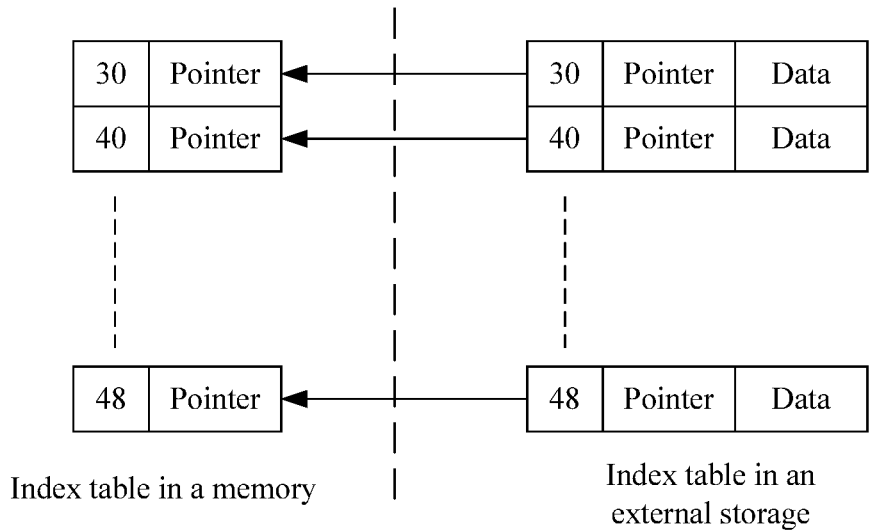
FIG. 2B is a schematic diagram of implementation of creating a sparse index table in a memory according to an index table in an external storage.

A manner of creating a dense index table is as follows. For each piece of data in a data table, an index record that is of each piece of data and that is in the index table in the external storage is added to the index table in the memory. Therefore, an index density of the sparse index table is equal to 1. FIG. 2B is used as an example. In FIG. 2B, keyword values of keywords in an index table in an external storage are ranked, and the ranked keyword values are {30, 40, . . . , 48}. All the keyword values included in the index table in the external storage are added to an index table in a memory. Therefore, keyword values in index records included in the index table in the memory are sequentially {30, 40, . . . , 48}.

After the index table is created in the memory, when a data processor changes data included in the data table in the external storage, the data processor synchronously changes the data in the memory if the data is cached in the memory. When the data included in the data table is changed, an index record corresponding to the data may be changed, or may be not changed.

For example, assuming that the index record includes only a keyword value, if the data is changed, and a keyword value of the data is not changed, the index record of the data does not need to be changed; or assuming that the index record includes only a keyword value and a pointer (a pointer pointing to a storage address of the data), if the data is changed, and the keyword value of the data is not changed, the index record of the data does not need to be changed; or assuming that the index record includes a keyword value, a pointer (a pointer pointing to a storage address of the data), some or all of the data, if the data is changed, only changed data in the index record needs to be changed.

After the index table in created in the memory, if the data processor deletes data included in the data table in the external storage, an index record of the data in the index table in the external storage is correspondingly deleted. If the data table in the memory also stores the index record of the data, the index record of the data in the memory is deleted. Optionally, if the memory further stores the data, the data is deleted. One possibility is that if storage space that is in the memory and that is for storing an index record stores the data, the data stored in the storage space is deleted.

After the index table is created in the memory, if the data processor writes new data into the data table in the external storage, an index record needs to be created for the new data. The index record includes a keyword value included in the new data. The index record may further include a storage address (for example, a pointer pointing to the storage address) of the new data in the external storage. The index record may further include all or a part of the new data. In addition, it is determined, according to a current index density, whether to add the index record of the new data to the index table in the memory. If the index density is equal to 1, that is, the index table created in the memory is a dense index table, an index record newly added to the data table in the external storage each time is replicated to the index table in the memory. If the index density is less than 1, that is, the index table created in the memory is a sparse index table, multiple index records are added to the data table in the external storage. In this case, an index record that needs to be added to the index table in the memory is selected from the multiple index records at an interval according to the index density, and the selected index record is added to the index table in the memory. For example, if the index density is one third, when three index records are added to the data table in the external storage, the first index record in the three index records is added to the index table in the memory.

In this embodiment, storage space that is in the memory and that is for storing an index record is limited. A preset range is set for the limited storage space. For example, if the storage space that is in the memory and that is for storing an index record can store a maximum of N index records, it is determined that 80% of N is an upper limit of the preset range, and it is determined that 40% of N is a lower limit of the preset range.

In a process in which the data processor processes data in the data table, there are three cases of updating the index table in the memory in the present application.

In a first case, if the data processor deletes data included in the data table in the external storage, an index record of the data in the index table in the external storage is deleted. When the index table in the memory also stores the index record of the data, the index record of the data in the memory is deleted. If storage space occupied by a remaining index record in the memory after the index record is deleted is less than the lower limit of the preset range, it is determined whether the index table in the memory is a dense index table relative to the index table in the external storage, that is, it is determined whether an index density of the index table in the memory is equal to 1. If the index table in the memory is not a dense index table relative to the index table in the external storage (the index density of the index table in the memory is less than 1), the index density is increased, and an index record is reselected according to the increased index density at an interval from index records that have been ranked according to a keyword value and that are included in the index table in the external storage, and an index record in the index table in the memory is replaced with the selected index record, so as to complete an update of the index table in the memory according to the increased index density.

In a second case, if the data processor writes new data into the data table in the external storage, an index record of the new data is added to the index table in the external storage. The index record includes a keyword value included in the new data. The index record may further include a storage address (for example, a pointer pointing to the storage address) of the new data in the external storage. The index record may further include all or a part of the new data. In addition, it is further determined, according to a current index density, whether the index record of the new data is added to the index table in the memory. If the data processor constantly writes new data into the data table in the external storage, an index record of the new data is added to the index table in the memory according to a current index density, so as to implement a synchronous update of the index table in the memory. Once storage space occupied by the index table in the memory reaches the upper limit of the preset range, the index density is reduced, and an index record is reselected according to the reduced index density at an interval from index records that have been ranked according to a keyword value and that are included in the index table in the external storage, and an index record in the index table in the memory is replaced with the selected index record, so as to complete an update of the index table in the memory according to the reduced index density.

In a third case, in a process in which the data processor constantly deletes data included in the data table in the external storage, and deletes an index record of the data from the index table in the external storage, if the index table in the memory also stores the index record of the data, the index record of the data in the memory is synchronously deleted. If storage space occupied by a remaining index record in the memory after the index record is deleted is greater than the lower limit of the preset range, an index density is not adjusted. In addition, in a process in which the data processor constantly writes new data into the data table in the external storage, and adds an index record of the new data to the index table in the external storage, the index record of the new data is synchronously added to the index table in the memory according to a current index density. If storage space occupied by the index table in the memory is still less than the upper limit of the preset range, the index density is not adjusted.

In this embodiment, an index density can be adjusted when storage space for storing an index record in a memory is limited, and storage space occupied by an index table in the memory reaches an upper limit or a lower limit of a preset range. An index record is reselected from an index table from an external storage according to the adjusted index density, and the index table in the memory is updated using the reselected index record. In this way, when the storage space for storing an index record in the memory is limited, an index table is re-created in the memory by adjusting the index density, and a mapping relationship between the index table in the memory and the index table in the external storage is changed, so that each index record in the index table in the external storage can be efficiently retrieved according to the index table in the memory, thereby improving retrieval efficiency.

In a specific embodiment, when the data processor starts, index records are constantly read from the index table in the external storage, and the read index records are written into the storage space in the memory for storing an index record. Because the storage space is limited, a preset range is set according to the storage space in the manner in the foregoing embodiment. At the beginning of a process of copying index records in the index table in the external storage to the memory to create an index table in the memory, the index records in the index table in the external storage are copied to the memory one by one to create a dense index table in the memory. If storage space in the memory for storing an index record is insufficient, an index density is adjusted when storage space occupied by the index table in the memory reaches the upper limit of the preset range. The index table in the memory is updated according to the adjusted index density, and subsequently, an index record is selected according to the adjusted index density from the index table in the external storage, and the selected index record is added to the index table in the memory. By analogy, in the process of copying the index records in the index table in the external storage to the memory to create an index table in the memory, the index density may be adjusted for one or more times, and a finally created index table in the memory is a sparse index table. If the storage space in the memory for storing an index record is large enough, all the index records in the index table in the external storage are copied to the memory to create a dense index table.

In this embodiment, in a start-up phase of a data processor, and in a process of copying an index table in an external storage to a memory to create an index table in the memory, once storage space occupied by the index table in the memory reaches an upper limit of a preset range, an index density is adjusted once, so that an index table finally created in the memory can cover and fully map the index table in the external storage, and efficiency of keyword-based retrieval according to the index table in the memory is ensured.

Figure 3:
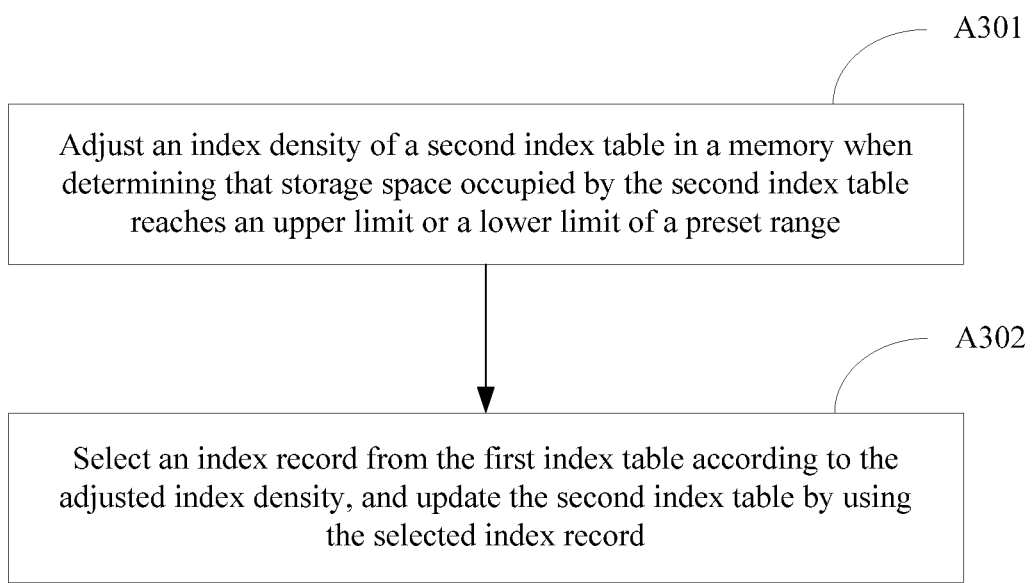
FIG. 3 is an example schematic flowchart of an index table update method provided from a perspective of a data processor.

According to an embodiment of the present application, the foregoing embodiment is corresponding extended to obtain a basic workflow for implementing an index table update method, as shown in FIG. 3. However, for ease of description, only a part related to this embodiment of the present application is illustrated. The index table update method shown in FIG. 3 is provided from a perspective of a data processor. The basic workflow provided in FIG. 3 includes step A301 and step A302.

Step A301: Adjust an index density of a second index table in a memory when determining that storage space occupied by the second index table reaches an upper limit or a lower limit of a preset range, where the index density of the second index table is a ratio of a quantity of index records included in the second index table to a quantity of index records included in a first index table in an external storage, and an index record in the second index table is synchronously updated according to the index density when an index record in the first index table is updated.

Step A302: Select an index record from the first index table according to the adjusted index density, and update the second index table using the selected index record.

In this embodiment, the first index table is an index table in the external storage, and the second index table is an index table in the memory. In addition, the index density in this embodiment is defined as follows. The index density is the ratio of the quantity of the index records included in the second index table to the quantity of the index records included in the first index table.

If a same index record is stored in both the first index table in the external storage and the second index table in the memory, when the index record is updated, the index record included in the first index table and the index record included in the second index table are synchronously updated.

In addition, if the data processor expects to delete an index record, and the index record is stored in both the first index table in the external storage and the second index table in the memory, the index record included in the first index table and the index record included in the second index table are synchronously deleted.

In addition, if the data processor expects to add an index record to the first index table, it is determined, according to a current index density, whether the index record needs to be added to the index table in the memory. If it is determined that the index record needs to be added to the index table in the memory, the index record is synchronously added to the first index table and the second index table. If it is determined that the index record does not need to be added to the index table in the memory, the index record is added to the first index table.

Same as the foregoing embodiment, because storage space in the memory for storing an index record is limited, in this embodiment, the preset range is further determined according to the limited storage space (storage space for storing an index record). The upper limit of the preset range is less than a storage capacity of the limited storage space. For example, the upper limit of the preset range is 80% of the limited storage space.

When an index record in the second index table is updated, if the storage space occupied by the second index table changes, it needs to be determined whether the changed storage space occupied by the second index table exceeds the preset range. Generally, if the storage space occupied by the second index table is increased to the upper limit of the preset range, or the storage space occupied by the second index table is reduced to the lower limit of the preset range, the index density is adjusted. An index record is reselected from the first index table according to the adjusted index density, and an index record in the second index table is replaced with the reselected index record, so as to update the second index table. A quantity of index records included in the updated second index table is within the preset range, and is not equal to the upper limit or the lower limit of the preset range. An adjustment range for adjusting the index density is not limited when the foregoing condition and effect are met.

In this embodiment, when data in a data table is updated, the first index table in the external storage and the second index table in the memory are synchronously updated. When the second index table is updated, if the storage space occupied by the second index table reaches the upper limit or the lower limit of the preset range, the index density is adjusted. An index record is reselected from the first index table according to the adjusted index density, and the second index table is updated using the reselected index record. Storage space occupied by the updated second index table is within the preset range, and is not equal to the upper limit or the lower limit of the preset range. In addition, it is ensured in real time that an index record in the first index table can be efficiently located when keyword-based retrieval is performed according to the second index table, and data (in other words, data retrieved according to the keyword) corresponding to the index record can be read from the memory or the external storage according to the located index record. When the data is cached in the memory, the data processor directly reads the data from the memory and uses the data as a result of the retrieval performed according to the keyword. If the data is not cached in the memory, the data processor needs to read the data from the external storage and use the data as the result of the retrieval performed according to the keyword.

Optionally, the method provided in FIG. 3 is optionally improved for a synchronous update of the first index table and the second index table. The method further includes step A401 and step A402. Step A401 and step A402 are independently performed, and are not sequential.

Step A401: Synchronously delete an index record from the second index table according to the first index table and the index density when deleting an index record from the first index table.

When deleting data included in the data table in the external storage, the data processor deletes an index record of the data from the first index table in the external storage. If the second index table in the memory also stores the index record of the data, the index record of the data is synchronously deleted from the second index table in the memory.

Step A402: Synchronously add an index record to the second index table according to the first index table and the index density when adding an index record to the first index table.

If the data processor writes new data into the data table in the external storage, an index record of the data is added to the first index table in the external storage. The index record includes a keyword value included in the new data. The index record may further include a storage address (for example, a pointer pointing to the storage address) of the new data in the external storage. The index record may further include all or a part of the new data. In addition, it is determined, according to a current index density, whether the index record of the new data is added to the second index table in the memory. If the data processor constantly writes new data into the data table in the external storage, and synchronously adds an index record of the new data to the second index table in the memory according to a current index density. Once storage space occupied by the second index table in the memory reaches the upper limit of the preset range, the index density is reduced, and an index record is reselected according to the reduced index density at an interval from index records that have been ranked according to a keyword value and that are included in the first index table in the external storage, and an index record in the second index table in the memory is replaced with the selected index record, so as to complete an update of the second index table in the memory according to the reduced index density.

Figure 4:
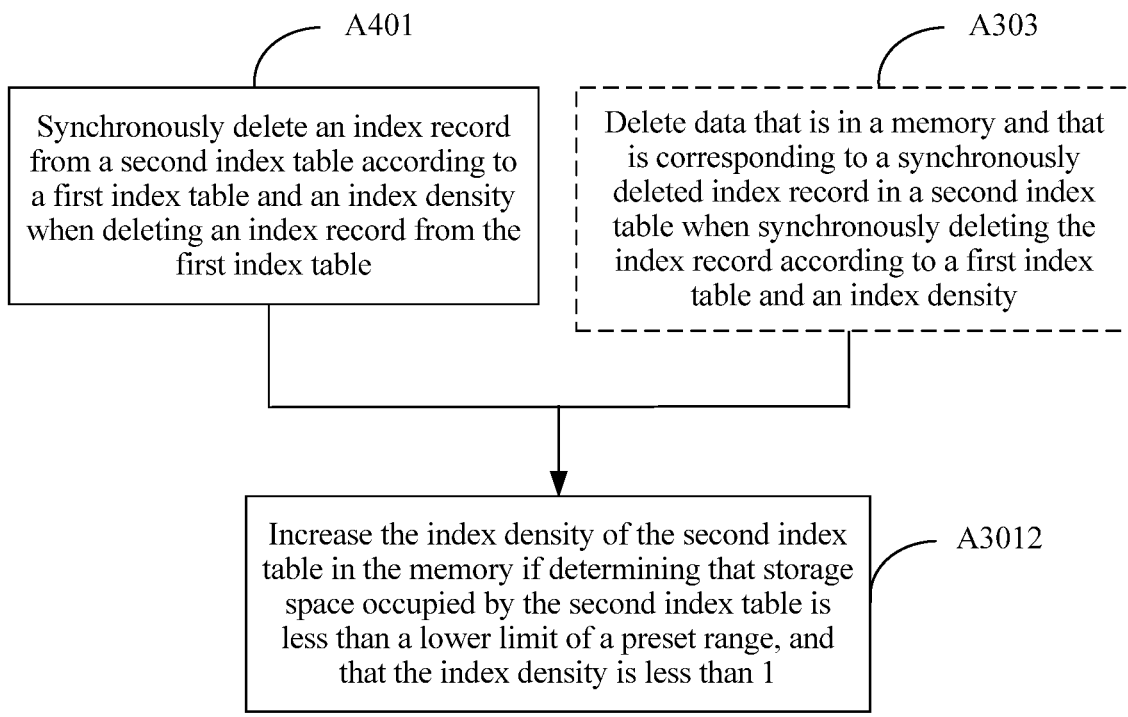
FIG. 4 is a flowchart of optional detailing on the index table update method provided in FIG. 3.

Optionally, detailed improvement is performed on the index table update method provided in FIG. 3. Referring to FIG. 4, if the first index table and the second index table are synchronously updated, the method further includes step A303.

Step A303: Delete data that is in the memory and that is corresponding to the synchronously deleted index record in the second index table when synchronously deleting the index record according to the first index table and the index density.

In execution of step A401, when the data processor deletes data included in the data table in the external storage, and synchronously deletes index records of the data in the first index table in the external storage and in the second index table in the memory, if the memory stores the data, one possibility is that the data is stored in storage space in the memory for storing an index record, and step A303 is performed to delete the data in the memory.

In this way, the storage space in the memory for storing the data can be released, and the storage space may be used for caching other data.

Optionally, for a case in which the storage space occupied by the second index table reaches the upper limit of the preset range, detailed improvement is performed based on step A301 in FIG. 3. The adjusting an index density of a second index table in a memory when determining that storage space occupied by the second index table reaches an upper limit or a lower limit of a preset range includes the following steps.

Step A3011: Reduce the index density of the second index table in the memory if determining that the storage space occupied by the second index table reaches the upper limit of the preset range.

The data processor writes new data into the data table in the external storage, adds an index record of the new data to the first index table in the external storage, and adds, according to a current index density, the index record of the new data to the second index table in the memory. Once the storage space occupied by the second index table reaches the upper limit of the preset range, the index density is reduced. A reduction range for the index density is not limited herein, but storage space occupied by a re-created second index table (including an index record selected from the first index table according to the reduced index density) needs to be greater than the lower limit of the preset range and less than the upper limit of the preset range.

After the index density is reduced in step A3011, a process of updating the second index table in step A302 is reselecting an index record from the first index table according to the reduced index density, and replacing an index record in the second index table with the reselected index record, so as to complete an update of the second index table. There are at least two following replacement manners of replacing the index record in the second index table with the reselected index record, and no limitation is imposed herein.

An optional replacement manner is replacing all index records in the second index table with the reselected index record, so as to complete the update of the second index table.

Another optional replacement manner is, after reselecting an index record from the first index table according to the reduced index density, for an index record in the second index table same as the reselected index record, reserving the same index record in the second index table; and for an index record in the second index table different from the reselected index record, deleting the different index record, and then adding an index record that is in the reselected index record and that is different from an index record in the second index table to the second index table, so as to complete the update of the second index table.

Another optional replacement manner is, if the index density before reduction in step A3011 and the index density after reduction in step A3011 are in a multiple relationship, deleting an index record in the second index table at a uniform interval according to the multiple relationship, so as to complete the update of the second index table. The deleting an index record in the second index table at a uniform interval according to the multiple relationship is calculating a quantity of index records in an interval according to the multiple relationship, and deleting one index record at the interval of the quantity of index records in the second index table.

Optionally, for a case in which the storage space occupied by the second index table reaches the lower limit of the preset range, detailed improvement is performed based on step A301 in FIG. 3. The adjusting an index density of a second index table in a memory when determining that storage space occupied by the second index table reaches an upper limit or a lower limit of a preset range includes the following steps.

Step A3012: Increase the index density of the second index table in the memory if determining that the storage space occupied by the second index table is less than the lower limit of the preset range, and that the index density is less than 1, where the increased index density is less than or equal to 1.

In a process in which the data processor deletes data included in the data table in the external storage, and deletes an index record of the data from the first index table in the external storage, if the second index table in the memory also stores the index record of the data, the index record of the data in the second index table is synchronously deleted. After the index record is deleted, if storage space occupied by a remaining index record in the second index table is less than the lower limit of the preset range, it is determined whether the second index table is a dense index table relative to the first index table in the external storage (in other words, it is determined whether the index density of the second index table is equal to 1). If the second index table is not a dense index table relative to the first index table (the index density of the second index table in the memory is less than 1), the index density is increased. An increase range for the index density is not limited herein, but storage space occupied by a re-created second index table (including an index record selected from the first index table according to the increased index density) needs to be greater than the lower limit of the preset range and less than the upper limit of the preset range.

After the index density is increased in step A3012, a process of updating the second index table in step A302 is reselecting an index record from the first index table according to the increased index density, and replacing an index record in the second index table with the reselected index record, so as to complete an update of the second index table. There are at least two following replacement manners of replacing the index record in the second index table with the reselected index record, and no limitation is imposed herein.

An optional replacement manner is replacing all index records in the second index table with the reselected index record, so as to complete the update of the second index table.

Another optional replacement manner is, after reselecting an index record from the first index table according to the increased index density, for an index record in the second index table same as the reselected index record, reserving the same index record in the second index table; and for an index record in the second index table different from the reselected index record, deleting the different index record, and then adding an index record that is in the reselected index record and that is different from an index record in the second index table to the second index table, so as to complete the update of the second index table.

In this embodiment, storage space in the memory for storing an index record is limited, and a size of the storage space may be changed according to an index record storage requirement, and a maximum quantity of index records that can be stored in the storage space may be correspondingly changed. Further, the upper limit of the preset range is less than the limited storage space (the storage space in the memory for storing an index record). For example, a value of the upper limit of the preset range is equal to 80% of the limited storage space. Therefore, when the limited storage space is determined, the upper limit of the preset range is correspondingly determined.

The lower limit of the preset range may be manually set. A larger lower limit of the preset range indicates a higher probability of re-determining an index density during an update of an index record in the second data table and consequently indicates a larger quantity of times of re-generating the second index table in the memory according to the re-determined index density and the first index table, a higher system cost, and heavier load of the data processor.

A smaller lower limit of the preset range indicates a lower probability of re-determining an index density during an update of an index record in the second data table, and consequently indicates a smaller quantity of times of re-generating the second index table in the memory according to the re-determined index density and the first index table, a lower system cost, and lighter load of the data processor.

Figure 5:
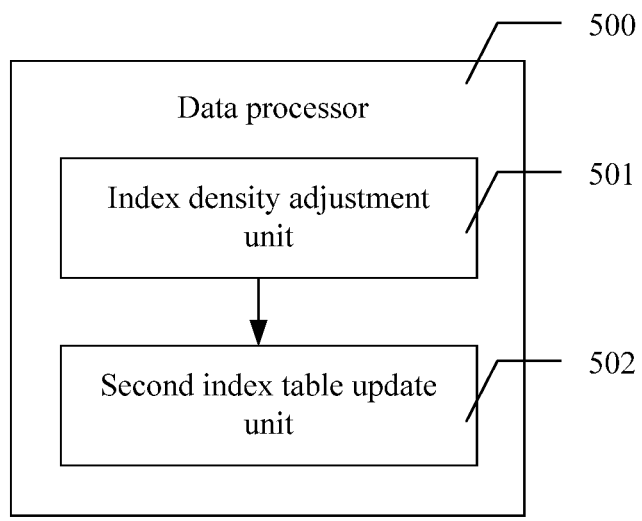
FIG. 5 is a schematic diagram of a logical structure of a data processor 500.

An embodiment of the present application provides a data processor 500. FIG. 5 shows a schematic diagram of a logical structure of the data processor 500 provided in this embodiment. For ease of description, FIG. 5 shows only a part related to this embodiment of the present application.

Referring to FIG. 5, the data processor 500 includes an index density adjustment unit 501 configured to adjust an index density of a second index table in a memory when it is determined that storage space occupied by the second index table reaches an upper limit or a lower limit of a preset range, where the index density of the second index table is a ratio of a quantity of index records included in the second index table to a quantity of index records included in a first index table in an external storage, and an index record in the second index table is synchronously updated according to the index density when an index record in the first index table is updated; and a second index table update unit 502 configured to select an index record from the first index table according to the adjusted index density, and update the second index table using the selected index record.

Optionally, that an index density adjustment unit 501 is configured to adjust an index density of a second index table in a memory when it is determined that storage space occupied by the second index table reaches an upper limit or a lower limit of a preset range includes the index density adjustment unit 501 is configured to reduce the index density of the second index table in the memory if it is determined that the storage space occupied by the second index table reaches the upper limit of the preset range.

Optionally, that an index density adjustment unit 501 is configured to adjust an index density of a second index table in a memory when it is determined that storage space occupied by the second index table reaches an upper limit or a lower limit of a preset range includes the index density adjustment unit 501 is configured to increase the index density of the second index table in the memory if it is determined that the storage space occupied by the second index table is less than the lower limit of the preset range, and that the index density is less than 1.

Figure 6:
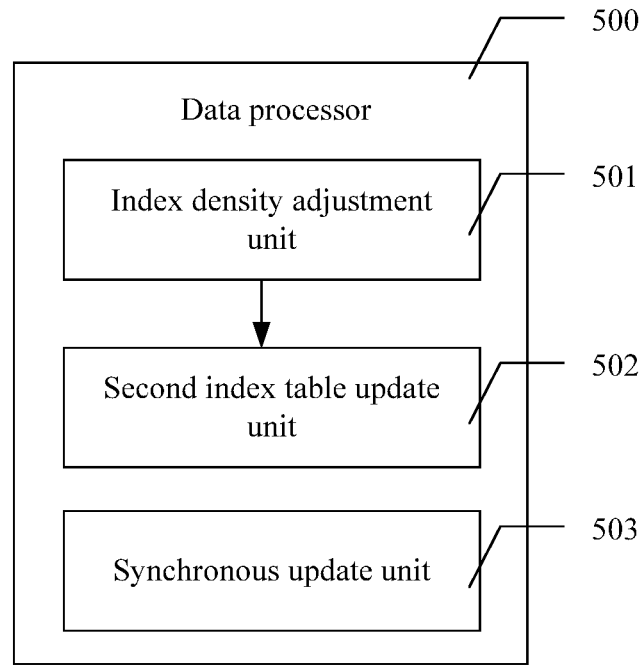
FIG. 6 is a schematic diagram of a logical structure for optional detailing on a data processor 500.

Optionally, referring to FIG. 6, the data processor 500 further includes a synchronous update unit 503 configured to synchronously delete an index record from the second index table according to the first index table and the index density when deleting an index record from the first index table.

The synchronous update unit 503 is configured to synchronously add an index record to the second index table according to the first index table and the index density when adding an index record to the first index table.

Further, optionally, the synchronous update unit 503 is further configured to delete data that is in the memory and that is corresponding to the synchronously deleted index record when synchronously deleting the index record from the second index table according to the first index table and the index density.

Figure 7:
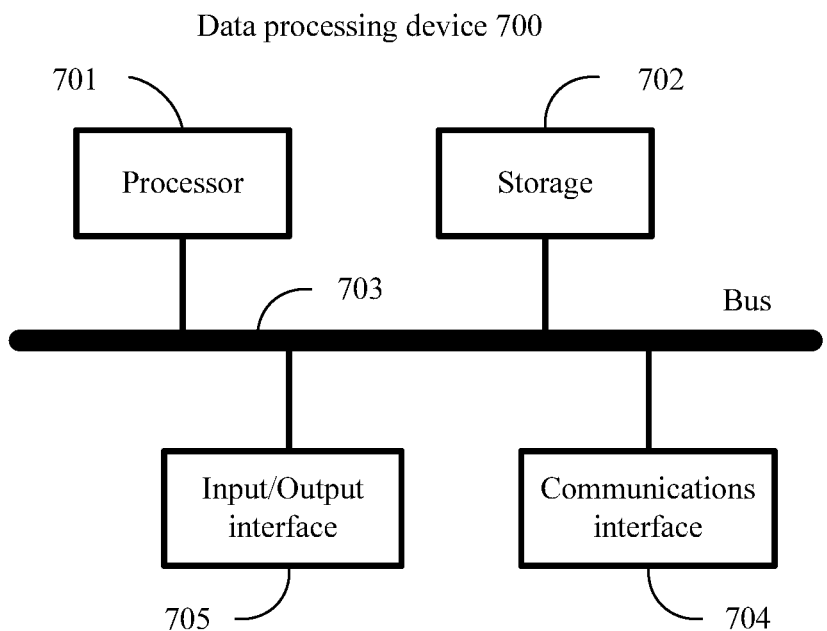
FIG. 7 is a schematic structural diagram of hardware of a data processing device 700.

An embodiment of the present application provides a data processing device 700. FIG. 7 is a schematic structural diagram of hardware of the data processing device 700 provided in this embodiment, and shows a hardware structure of the data processing device 700.

As shown in FIG. 7, the data processing device 700 includes a processor 701 and a storage 702. The processor 701 and the storage 702 are connected using a bus 703.

The storage 702 is configured to store a computer-executable instruction, and when the data processing device 700 runs, the processor 701 reads the computer-executable instruction in the storage 702, so that the data processing device 700 executes the index table update method provided in the foregoing embodiments. For a specific implementation of the index table update method, refer to the procedures of the index table update method provided in the foregoing embodiments, and details are not described herein again.

The processor 701 may be a general CPU, a microprocessor, an application-specific integrated circuit (ASIC), or one or more integrated circuits that are configured to execute a related program, so as to implement the technical solutions provided in the embodiments of the present application. The technical solution implementation includes executing the index table update method provided in the foregoing embodiments of the present application.

The storage 702 may be a read-only memory (ROM), a static storage device, a dynamic storage device, or a random access memory (RAM). The storage 702 may store an operating system and another application program. When the technical solutions provided in the embodiments of the present application are implemented using software or firmware, program code used to implement the technical solutions provided in the embodiments of the present application is stored in the storage 702, and is executed by the processor 701. The program code storage includes storing, in the storage 702, program code of the index table update method that is provided in the foregoing embodiments and that is applied to the data processing device 700.

The bus 703 may include a channel through which information is transmitted between parts (such as the processor 701 and the storage 702) of the data processing device 700. For example, the bus 703 connects the processor 701 to the storage 702. The processor 701 accesses the storage 702 using the bus 703. The access includes writing data into the storage 702 and further reading data from the storage 702.

Optionally, the data processing device 700 further includes an input/output interface 705. The input/output interface 705 is configured to receive input data and information, and to output data such as an operation result.

Optionally, a communications interface 704 implements network communication between the data processing device 700 and another device or a communications network using a transceiver apparatus including but not limited to a transceiver. Optionally, the communications interface 704 may be various interfaces for connecting to a network, such as an Ethernet interface for connecting to an Ethernet. The Ethernet interface includes but is not limited to an RJ-45 interface, an RJ-11 interface, a subscriber connector (SC) optical interface, a fiber distributed data interface (FDDI) interface, an attachment unit interface (AUI) interface, a Bayonet Neill-Concelman (BNC) interface, a console interface, or the like.

It should be noted that although the data processing device 700 shown in FIG. 7 shows only the processor 701, the storage 702, and the bus 703, in a specific implementation process, a person skilled in the art should understand that the data processing device 700 further includes another component required for implementing normal running. Furthermore, a person skilled in the art should understand that, according to a specific requirement, the data processing device 700 may further include a hardware component that implements another additional function. In addition, a person skilled in the art should understand that the data processing device 700 may include only components necessary for implementing the embodiments of the present application, and does not necessarily include all components shown in FIG. 7.

In the several embodiments provided in the present application, it should be understood that the disclosed data processor, device, and method may be implemented in other manners. For example, the described data processor embodiment is merely an example. For example, the module and unit division is merely logical function division and may be other division during implementation. For example, a plurality of modules, units or components may be combined or integrated into another system or device, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts as units may or may not be physical modules, may be located in one position, or may be distributed on a plurality of network modules. Some or all of the modules may be selected according to actual needs to achieve the objectives of the solutions of the embodiments.

In addition, functional units in the embodiments of the present application may be integrated into one processing module, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present application. The foregoing external storage includes any medium that can store program code, such as a removable hard disk, a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, a person of ordinary skill in the art should understand that they may still make modifications to the technical solutions described in the foregoing embodiments or make equivalent replacements to some technical features thereof, without departing from the protection scope of the technical solutions of the embodiments of the present application.

What is claimed is:

1. An index table update method, comprising:
adjusting an index density of a second index table in a memory when determining that storage space occupied by the second index table reaches an upper limit or a lower limit of a preset range, wherein the index density of the second index table is a ratio of a quantity of index records comprised in the second index table to a quantity of index records comprised in a first index table in an external storage, and wherein an index record in the second index table is synchronously updated according to the index density of the second index table when an index record in the first index table is updated;
selecting an index record from the first index table according to the adjusted index density of the second index table; and
updating the second index table using the selected index record.

2. The method according to claim 1, wherein adjusting the index density of the second index table in the memory when determining that the storage space occupied by the second index table reaches the upper limit or the lower limit of the preset range comprises reducing the index density of the second index table in the memory when determining that the storage space occupied by the second index table reaches the upper limit of the preset range.

3. The method according to claim 1, wherein adjusting the index density of the second index table in the memory when determining that the storage space occupied by the second index table reaches the upper limit or the lower limit of the preset range comprises increasing the index density of the second index table in the memory when determining that the storage space occupied by the second index table is less than the lower limit of the preset range, and that the index density of the second index table is less than 1.

4. The method of according to claim 1, further comprising:
synchronously deleting an index record from the second index table according to the first index table and the index density of the second index table when deleting an index record from the first index table; and
synchronously adding an index record to the second index table according to the first index table and an index density of the first index table when adding an index record to the first index table.

5. The method according to claim 4, further comprising deleting data in the memory and corresponding to the synchronously deleted index record when synchronously deleting the index record in the second index table according to the first index table and the index density of the first index table.

6. The method according to claim 1, further comprising a sparse index table that divides data in the external storage into multiple groups according to a keyword value, and ranking the groups according to keyword value.

7. The method according to claim 1, further comprising a sparse index table that divides data in the external storage into multiple groups according to a keyword value, and ranking index records according to keyword value.

8. A data processing device, comprising:
a processor; and
a storage coupled to the processor and storing instructions for execution by the processor, wherein instructions instruct the processor to:
adjust an index density of a second index table in a memory when storage space occupied by the second index table reaches an upper limit or a lower limit of a preset range, wherein the index density of the second index table is a ratio of a quantity of index records comprised in the second index table to a quantity of index records comprised in a first index table of an external storage, and wherein an index record in the second index table is synchronously updated according the index density of the second index table when an index record in the first table is updated;
select an index record from the first index table according to the adjusted index density of the first index table; and
update the second index table using the selected index record.

9. The data processing device according to claim 8, wherein the instructions instruct the processor to reduce the index density of the second index table in the memory when the storage space occupied by the second index table reaches the upper limit of the preset range.

10. The data processing device according to claim 8, wherein the instructions instruct the processor to increase the index density of the second index table in the memory when the storage space occupied by the second index table is less than the lower limit of the preset range, and that the index density of the second index table is less than 1.

11. The data processing device according to claim 8, wherein the instructions instruct the processor to:
synchronously delete an index record from the second index table according the first index table and the index density of the second index table when deleting an index record from the first index table; or
synchronously add an index record to the second index table according to the first index table and an index density of the first index when adding an index record to the first index table.

12. The data processing device according to claim 11, wherein the instructions instruct the processor to delete data in the memory and also synchronously delete a corresponding index record from the second index table according to the first index table and the index density of the first index table.

13. The data processing device according to claim 8, further comprising a dense index table that contains an index record for each piece of data in a data table is added to an index table in memory.

14. A computer program product comprising a non-transitory computer-readable medium storing a set of instructions that when executed by a processor instruct the processor to:
adjust an index density of a second index table in a memory when storage space occupied by the second index table reaches an upper limit or a lower limit of a preset range, wherein the index density of the second index table is a ratio of a quantity of index records comprised in the second index table to a quantity of index records comprised in a first index table in an external storage, and wherein an index record in the second index table is synchronously updated according to the index density of a first index table when an index record in the first index table is updated;
select an index record from the first index table according to the adjusted index density of the first index table; and
update the second index table using the selected index record.

15. The computer program product according to claim 14, wherein the set of instructions instruct the processor to reduce the index density of the second index table in the memory when the storage space occupied by the second index table reaches the upper limit of the preset range.

16. The computer program product according to claim 14, wherein the set of instructions instruct the processor to increase the index density of the second index table in the memory when the storage space occupied by the second index table is less than the lower limit of the preset range, and that a index density of the first index table is less than 1.

17. The computer program product according to claim 14, wherein the set of instructions instruct the processor to:
   synchronously delete an index record from the second index table according to the first index table and an index density of the first index table when deleting an index record from the first index table; or
   synchronously add an index record to the second index table according to the first index table and the index density of the first index table when adding an index record to the first index table.

18. The computer program product according to claim 17, wherein the set of instructions instruct the processor to delete data in the memory and also synchronously delete a corresponding index record from the second index table according to the first index table and the index density of the first index table.

19. The computer programming product according to claim 14, further comprising a sparse index table that divides data in the external storage into multiple groups according to a keyword value, and ranking the groups according to keyword value.

20. The computer program product according to claim 14, further comprising a dense index table that contains an index record for each piece of data in a data table is added to an index table in memory.

* * * * *

UNITED STATES PATENT AND TRADEMARK OFFICE
CERTIFICATE OF CORRECTION

PATENT NO. : 10,642,817 B2
APPLICATION NO. : 15/715585
DATED : May 5, 2020
INVENTOR(S) : Xiaohao Liang, Xiaoyong Lin and Tieying Wang Page 1 of 1

It is certified that error appears in the above-identified patent and that said Letters Patent is hereby corrected as shown below:

In the Claims

Claim 8, Column 17, Line 63: "table of an external storage" should read "table in an external storage"

Signed and Sealed this
Thirtieth Day of June, 2020

Andrei Iancu
*Director of the United States Patent and Trademark Office*